(12) United States Patent
Chandrasekaran et al.

(10) Patent No.: US 10,832,145 B2
(45) Date of Patent: Nov. 10, 2020

(54) TECHNIQUES FOR RESOLVING ENTITIES IN RECEIVED QUESTIONS

(71) Applicant: INTERNATIONAL BUSINESS MACHINES CORPORATION, Armonk, NY (US)

(72) Inventors: Swaminathan Chandrasekaran, Coppell, TX (US); Joseph M. Kaufmann, Austin, TX (US); Lakshminarayanan Krishnamurthy, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 874 days.

(21) Appl. No.: 14/874,934

(22) Filed: Oct. 5, 2015

(65) Prior Publication Data

US 2017/0098163 A1 Apr. 6, 2017

(51) Int. Cl.
*G06N 5/04* (2006.01)

(52) U.S. Cl.
CPC ..................... *G06N 5/04* (2013.01)

(58) Field of Classification Search
CPC ........... G06F 17/3043; G06F 17/30528; G06F 17/30575; G06F 17/30604; G06F 17/30699; G06F 17/30598
See application file for complete search history.

(56) References Cited

U.S. PATENT DOCUMENTS

| | | | |
|---|---|---|---|
| 8,374,844 B2 | 2/2013 | Brun et al. | |
| 8,594,996 B2 | 11/2013 | Liang et al. | |
| 8,660,849 B2 * | 2/2014 | Gruber | G06F 17/3087 704/275 |
| 9,009,134 B2 | 4/2015 | Xu et al. | |
| 9,336,269 B1 * | 5/2016 | Smith | G06F 17/30864 |
| 2006/0161544 A1 * | 7/2006 | Lee | G06F 17/3043 |
| 2011/0258556 A1 * | 10/2011 | Kiciman | G06Q 10/10 715/751 |
| 2011/0320187 A1 | 12/2011 | Motik et al. | |
| 2013/0173604 A1 * | 7/2013 | Li | G06F 16/9535 707/723 |
| 2013/0262501 A1 | 10/2013 | Kuchmann-Beauger et al. | |
| 2014/0280307 A1 * | 9/2014 | Gupta | G06F 17/30657 707/769 |

(Continued)

OTHER PUBLICATIONS

Berant, Jonathan, et al., Semantic Parsing on Freebase from Question-Answer Pairs, Proc. of the 2013 Conference on Empirical Methods in Natural Language Processing, pp. 1533-1544, Oct. 2013. (Year: 2013).*

(Continued)

*Primary Examiner* — Kamran Afshar
*Assistant Examiner* — Ying Yu Chen
(74) *Attorney, Agent, or Firm* — Brian F Russell; Diana Roberts Gerhardt (57) ABSTRACT

A technique for resolving entities provided in a question includes creating respective entity context vectors (ECVs) for respective entities in an applicable knowledge graph (KG). A question is received from a user. A first entity is identified in the question. The first entity is associated with a matching one of the entities in the KG. An ECV for the matching one of the entities in the KG is modified. An answer to the question is generated based on the modified ECV.

17 Claims, 6 Drawing Sheets

(56) References Cited

U.S. PATENT DOCUMENTS

2015/0286747 A1* 10/2015 Anastasakos ....... G06F 16/9017
707/776
2015/0370787 A1* 12/2015 Akbacak ............. G06F 17/2836
704/2

OTHER PUBLICATIONS

Bollacker, Kurt, et al., Freebase: A Collaboratively Created Graph Database for Structuring Human Knowledge, ACMD SIGMOD/PODS Conference (Jun. 2008), pp. 1247-1249 (Year: 2008).*
Xianpei Han and Jun Zhao, "Named Entity Disambiguation by Leveraging Wikipedia Semantic Knowledge", 2009, ACM, pp. 215-224. (Year: 2009).*
Lingfeng Niu, Jianmin Wu, and Yong Shi, "Entity resolution with attribute and connection graph", 2011, 2011 11th IEEE International Conference on Data Mining Workshops, pp. 267-271. (Year: 2011).*

* cited by examiner

TECHNIQUES FOR RESOLVING ENTITIES IN RECEIVED QUESTIONS

BACKGROUND

The present disclosure is generally directed to techniques for resolving entities in received questions and, more specifically, to techniques for automated entity resolution in a knowledge graph based on user interactions in a question answering system.

Watson is a question answering (QA) system (i.e., a data processing system) that applies advanced natural language processing, information retrieval, knowledge representation, automated reasoning, and machine learning technologies to the field of open domain question answering. In general, conventional document search technology receives a keyword query and returns a list of documents, ranked in order of relevance to the query (often based on popularity and page ranking). In contrast, QA technology receives a question expressed in a natural language, seeks to understand the question in greater detail than document search technology, and returns a precise answer to the question.

The Watson system reportedly employs more than one-hundred different algorithms to analyze natural language, identify sources, find and generate hypotheses, find and score evidence, and merge and rank hypotheses. The Watson system implements DeepQA™ software and the Apache™ unstructured information management architecture (UIMA) framework. Software for the Watson system is written in various languages, including Java, C++, and Prolog, and runs on the SUSE™ Linux Enterprise Server 11 operating system using the Apache Hadoop™ framework to provide distributed computing. As is known, Apache Hadoop is an open-source software framework for storage and large-scale processing of datasets on clusters of commodity hardware.

The Watson system employs DeepQA software to generate hypotheses, gather evidence (data), and analyze the gathered data. The Watson system is workload optimized and integrates massively parallel POWER7® processors. The Watson system includes a cluster of ninety IBM Power 750 servers, each of which includes a 3.5 GHz POWER7 eight core processor, with four threads per core. In total, the Watson system has 2,880 POWER7 processor cores and has 16 terabytes of random access memory (RAM). Reportedly, the Watson system can process 500 gigabytes, the equivalent of one million books per second. Sources of information for the Watson system include encyclopedias, dictionaries, thesauri, newswire articles, and literary works. The Watson system also uses databases, taxonomies, and ontologies.

Cognitive systems learn and interact naturally with people to extend what either a human or a machine could do on their own. Cognitive systems help human experts make better decisions by penetrating the complexity of 'Big Data'. Cognitive systems build knowledge and learn a domain (i.e., language and terminology, processes and preferred methods of interacting) over time. Unlike conventional expert systems, which have required rules to be hard coded into an expert system by a human expert, cognitive systems can process natural language and unstructured data and learn by experience, similar to how humans learn. While cognitive systems have deep domain expertise, instead of replacing human experts, cognitive systems act as a decision support system to help human experts make better decisions based on the best available data in various areas (e.g., healthcare, finance, or customer service).

U.S. Patent Application Publication No. 2009/0249198 discloses the use of user input and context to facilitate an auto-complete feature. U.S. Pat. No. 8,538,898 discloses machine learning (ML) techniques, such as interactive support vector machines (SVMs), that are employed to classify and organize a defined list of names. U.S. Pat. No. 8,594,996 discloses the use of linguistic analysis and context to recognize and disambiguate entities included within a knowledge base/knowledge graph.

BRIEF SUMMARY

Disclosed are a method, a data processing system, and a computer program product (embodied in a computer-readable storage device) for resolving entities in received questions.

A technique for resolving entities provided in a question includes creating respective entity context vectors (ECVs) for respective entities in a knowledge graph (KG). A question is received from a user. A first entity is identified in the question. The first entity is associated with a matching one of the entities in the KG. An ECV for the matching one of the entities in the KG is modified. An answer to the question is generated based on the modified ECV.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

The illustrative embodiments provide a method, a data processing system, and a computer program product (embodied in a computer-readable storage device) for resolving entities in received questions.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As may be utilized herein, the term 'coupled' encompasses a direct electrical connection between components or devices and an indirect electrical connection between components or devices achieved using one or more intervening components or devices. As used herein, the terms 'data' and 'evidence' are interchangeable.

In general, a knowledge graph (KG) may be configured to store information about a specific domain and is composed of entities (nodes) and relationships (edges) between the entities. Each entity may have one or more attributes that describe the entity. Unstructured content, such as journals, literature, and reference manuals, may be accessed to extract entities for a given domain and relationships between the entities. Annotators/extractors may be created to extract entities from unstructured content based on a statistical/rule based approach. In general, annotators use lexicons and dictionaries to establish patterns that facilitate extracting entities from unstructured content (e.g., unstructured documents). A KG, in general, supports analysis of entities included within the KG. However, as new content is processed, different 'surface forms' may be used to represent an established entity. For example, a KG constructed using data prior to the year 2016 may contain references to 'President Doe'. In contrast, a KG constructed using data subsequent to the year 2016 will probably refer to former 'President Doe' as 'John Doe' or 'former President Doe'.

A non-exhaustive list of reasons that an entity may be referred to in different ways includes: a change in title (e.g., moving from representative to senator to president); a change in status (e.g., getting married); and a change in group association (e.g., moving from one professional sports team to another professional sports team). As used herein, the term 'surface forms' refers to different forms or terms that refer to a same entity. The term 'entity resolution', as used herein, refers to the task of determining new surface forms for an entity. According to various aspects of the present disclosure, techniques for understanding how users of a QA system that implements natural language processing (NLP) are using certain terms/concepts (e.g., 'Doe' versus 'John Doe' versus 'Mr. Doe') are employed to process questions, as the questions are received, in an attempt to prevent an associated KG from becoming stale with respect to how users are currently presenting questions to the QA system.

In one or more embodiments, specific surface forms may be introduced into a KG domain as questions are received and, based on prevalent usage, surface forms for an entity that are temporal may be removed from the KG domain. For example, in a corpus that includes data no later than the year 2008 the entity 'John Doe' may be referred to as 'Senator Doe'. As another example, in a corpus that includes data from the year 2008 to the year 2016 the entity 'John Doe' may only be referred to as 'President Doe'. In the event a QA system is aware that the entity 'John Doe' is referred to as 'President Doe' in a corpus with data for the year 2008 to the year 2016 a QA system should be able to answer questions about 'President Doe' (e.g., "What was President Doe's age in 2010?"). In various embodiments, the disclosed techniques may account for multi-factorial context attributes (e.g., age, gender, location) on which a natural language question is based and, as such, recognize associated surface forms.

According to the present disclosure, a knowledge base (e.g., a KG) is updated when a new surface form for an entity is disambiguated such that later entity resolutions for the entity are aware of the new surface form (e.g., when a QA system has previously determined that the entity 'Hawks' is a surface form of the entity 'Seattle Seahawks' a subsequent entity resolution begins with the knowledge that the entity 'Hawks' is a surface form of the entity 'Seattle Seahawks'). According to aspects of the present disclosure, techniques are employed that focus on learning which entity surface forms are most relevant in a given domain. According to one or more embodiments, questions are processed as the questions are received by a QA system and surface forms in the questions are ranked. It should be appreciated that there are conventional approaches to entity resolution that work only with structured data (such as databases or KGs). There are also conventional approaches to entity resolution that work only with unstructured data (e.g., raw text). However, there are no known conventional entity resolution approaches that perform entity resolution on questions (as contrasted with corpora/databases) in real-time.

According to various embodiments of the present disclosure, techniques for real-time entity resolution on received questions are disclosed. In general, the disclosed techniques process questions as the questions are received to determine how users of a QA system are currently referring to entities in an associated KG. In general, while entities have various different surface forms, the utility of the different surface forms depends on a domain of a KG. For example, the entity 'John Doe' may be referred to as 'the Commander in Chief' in a military domain and as 'President Doe' in a general domain. Acquiring knowledge that a particular surface form (or set of surface forms) is more salient to a particular domain (or user) allows a QA system to better answer questions. For example, a QA system may rank passages that discuss 'the Commander in Chief' higher than passages that discuss 'John Doe' if the QA system receives a question from a user in the military domain. In general, such knowledge may also be utilized by a dialogue system, e.g., Cognea.

When communicating with members of the military, a system may choose to refer to the entity 'John Doe' as 'the Commander in Chief'. According to other aspects of the present disclosure, temporal reasoning may be enhanced. As previously mentioned, in a corpus that does not have data later than the year 2008, 'John Doe' may be referred to as 'Senator Doe'. As was also previously mentioned, in a corpus that only includes data from the year 2008 to the year 2016 the entity 'John Doe' is probably referred to as 'President Doe'. Using temporal reasoning, a QA system can answer a question about 'President Doe' (e.g., "What was President Doe's age in 2012?").

In various embodiments, a KG implements entity context vectors (ECVs) for all entities in a KG. In one or more embodiments, ECVs are derived by analyzing how entities are used within a given corpus. As users input questions into a QA system, entities are extracted from the questions. According to various embodiments, for all entities, surface forms of the entities (including canonical forms) are linked in an associated KG and the ECVs for the entities are updated to ensure the entities are relevant to a domain associated with the KG. An associated domain may be determined from information (including multi-factorial context attributes) about a user that inputs a question into a QA system, as well as the question itself.

As one example, assume User1 has the following multi-factorial context attributes: female; 45 years old; a member of the military; from San Antonio, Tex.; is using an Apple smart phone; in the middle of the night; and asks question Q1 (i.e., "What is the most recent executive order issued by the Commander in Chief?"). In this case, question Q1 with entities (Q1_with_entities) may be represented as: "What is the most recent executive order issued by the <entity>commander in chief?</entity>." Similarly, question Q1 with disambiguated entities (Q1_with_disambiguated_entities) may be represented as: "What is the most recent executive order issued by the <entity: ref='John Doe'>commander in chief?</entity>." In this example, according to the present disclosure, the ECV for the entity 'John Doe' is updated so that the ECV ranks the surface form 'commander in chief' more highly in the military domain.

As another example, assume User2 has the following multi-factorial context attributes: male; 21 years old; a student; from New York City; is using a tablet smart phone; in the middle of the day; and asks question Q2 (i.e., "What is the last order issued by Mr. President?"). In this case, question Q2 with entities (Q2_with_entities) may be represented as: "What is the last order issued by the <entity>Mr. President?</entity>." Similarly, question Q2 with disambiguated entities (Q2_with_disambiguated_entities) may be represented as: "What is the last order issued by the <entity: ref="John Doe">Mr. President?</entity>." In this example, according to the present disclosure, the ECV for 'John Doe' is updated so that the ECV ranks the surface form 'Mr. President' more highly in a general user/student domain.

In general, the disclosed techniques assume a relevant KG is available and that each entity in the KG has an ECV associated with the entity. The construction of KGs is well known and, for brevity, is not further discussed herein. Accessing a relevant KG facilitates determining where all entities are mentioned within a corpus. According to one or more embodiments, an ECV for an entity may be constructed that includes: dependency parses; bags of words; an entity type; and known surface forms for the entity. Dependency parses describe participation of the entity. As one example, a dependency parse may indicate that 'Doe' is President of the 'USA' (e.g., is_president_of(Doe, USA). A bag of words for the entity represent words/phrases that frequently co-occur with the entity (e.g., for 'John Doe' a bag of words may include 'President' and 'Commander in Chief'). An entity type provides information about the entity that is extracted from a KG. As one example, an entity type may indicate that the entity 'Doe' is a 'person' (e.g., is_a (Doe, person). Known surface forms for the entity 'John Doe' may include, for example, 'Senator Doe', 'President Doe', 'Doe', 'John Q. Doe', 'the President', and 'the Commander in Chief'.

For each question that is received, one or more entities are extracted from the received question. It should be appreciated that a question and answer interaction history may be utilized to store questions and answers for later processing. As one example, to resolve entities within a received question to a surface form of an entity within a domain appropriate KG an entity resolution technique, according to the present disclosure, may be employed. In various embodiments, entity resolution is performed to link entities in a received question to entities within a domain appropriate KG. For example, the entity resolution technique may be configured to iterate over all entities in a received question, with an entity that a QA system is currently trying to disambiguate being referred to as 'E_ambiguous'.

If available, a domain dictionary may be loaded into a QA system to facilitate entity disambiguation. As is known, a domain dictionary is a pre-computed set of weights for various surface forms. For example, 'Advil' may have the surface form '(RS)-2-(4-(2-methylpropyl)phenyl)propanoic acid'. As one example, a medical domain dictionary may assign a relatively high weight to the surface form '(RS)-2-(4-(2-methylpropyl)phenyl)propanoic acid', while a general domain dictionary may assign a relatively low weight to the surface form '(RS)-2-(4-(2-methylpropyl)phenyl)propanoic acid'.

According to one or more embodiments, a similarity threshold (Min_Sim) is defined. The similarity threshold (Min_Sim) is utilized by a QA system to facilitate determination of whether to accept a candidate surface form. As one example, cosine similarity may be utilized to compare the similarity between an ambiguous entity (E_ambiguous) and each ECV in a KG. In one or more embodiments, the ECV with highest cosine similarity (E_best) is merged with E_ambiguous (i.e., the surface form for the entity defined by E_ambiguous is added to the ECV) if and only if its similarity is above the similarity threshold (Min_Sim). The ECV for the ECV with highest cosine similarity (E_best) may also include information about how many users in a particular domain asked about an associated entity, which surface forms the users preferred using, and what percentage of questions include references to the entity.

In the event there are no ECVs with a similarity above the similarity threshold (Min_Sim), feedback may, for example, be requested from a user. In at least one embodiment, the ECV that is most similar to E_ambiguous is designated as E_potential_best and a determination is made as to whether E_ambiguous is the same entity as E_potential_best. For example, a question may be sent to a user asking whether the ECV designated as E_potential_best is the same entity as E_ambiguous. For example, the user that is asked the question may be a subject matter expert. If the user responds affirmatively, E_ambiguous is merged with E_potential_best. If the user responds negatively, then E_ambiguous is not in an associated ontology and an ECV for E_ambiguous may be created in the domain appropriate KG.

In one or more embodiments, confidence scores are generated for each recommended E_ambiguous and E_potential_best. In at least one embodiment, the E_ambiguous and E_potential_best entities are added to a dynamic normalization hash for further review. New surface form entities can be automatically added to a domain appropriate KG as preferred by users. Alternatively, a domain expert may review new surface form entities and make a determination as to whether to add the new surface form entities to the KG, e.g., based on the confidence scores.

Figure 1:
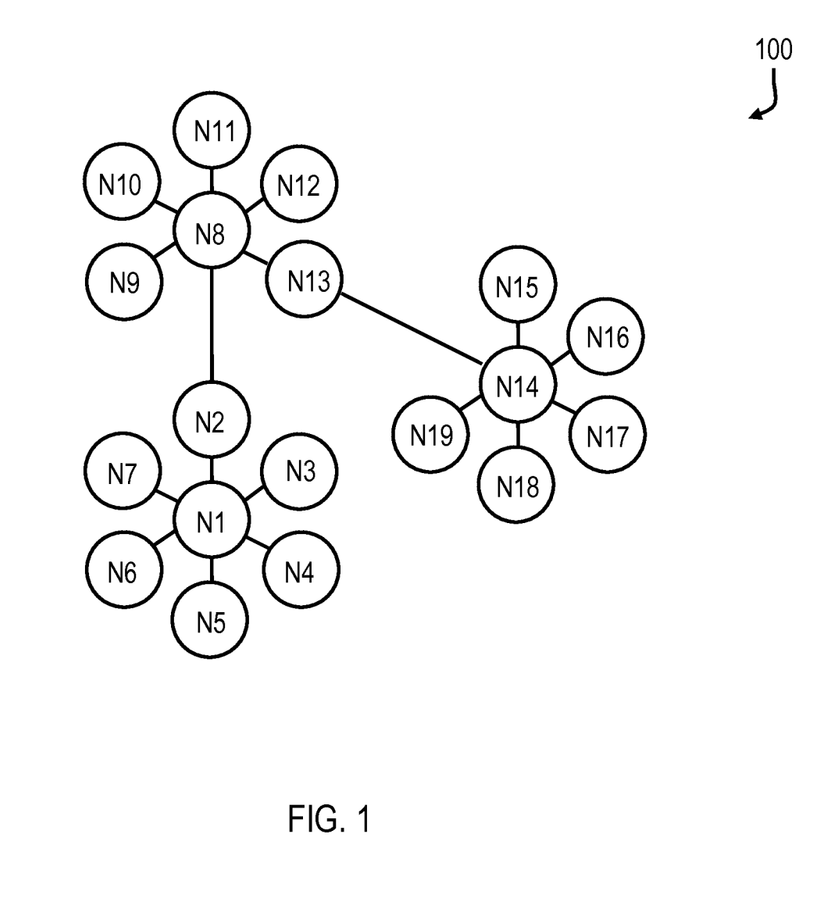
FIG. 1 is a diagram of an exemplary high performance computing (HPC) cluster that includes a number of nodes, with one or more of the nodes including multiple processors that are configured to function as a question answering (QA) system, according to various aspects of the present disclosure.

Conventionally, the Watson system has explored large amounts of structured and unstructured data to find candidate answers for a question (or a problem). According to various aspects of the present disclosure, techniques for performing high performance computing (HPC), or network computing, are described herein that facilitate resolving entities in received questions. With reference to FIG. 1, an example topology for a relevant portion of an exemplary HPC cluster (supercomputer) 100 includes a number of nodes (N1-N19) that are connected in, for example, a three-dimensional (3D) Torus topology. Each of the nodes (N1-N19) may include one or more symmetric multiprocessors (SMPs). While nineteen nodes are illustrated in FIG. 1, it should be appreciated that more or less than nineteen nodes may be present in an HPC cluster configured according to the present disclosure.

Figure 2:
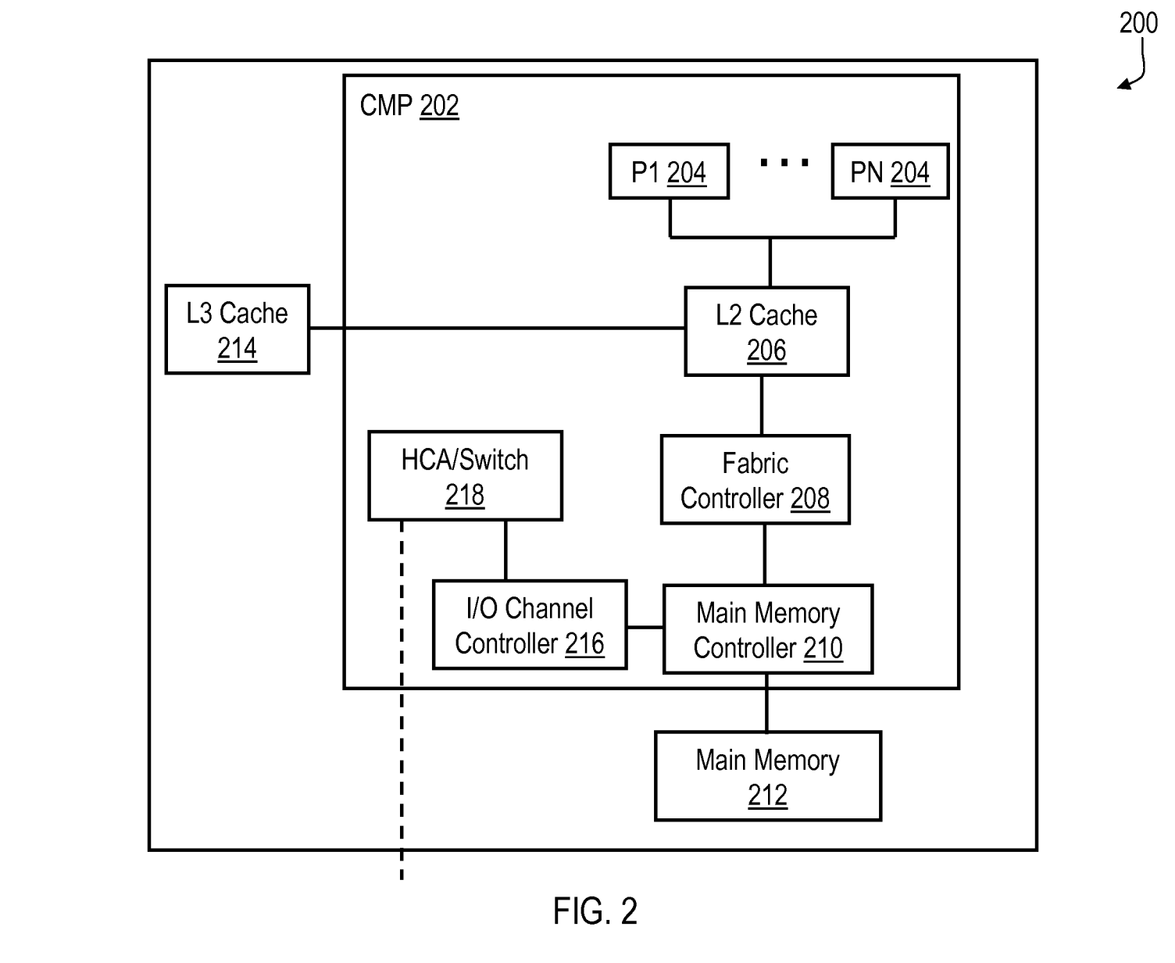
FIG. 2 is a diagram of a relevant portion of an exemplary symmetric multiprocessor (SMP) data processing system included in one of the nodes of FIG. 1, according to an embodiment of the present disclosure.

With reference to FIG. 2, each of the nodes N1-N18 of FIG. 1 may include a processor system, such as data processing system 200. As is illustrated, data processing system 200 includes one or more chip-level multiprocessors (CMPs) 202 (only one of which is illustrated in FIG. 2), each of which includes multiple (e.g., eight) processors 204. Processors 204 may, for example, operate in a simultaneous multithreading (SMT) mode or a single thread (ST) mode. When processors 204 operate in the SMT mode, processors 204 may employ multiple separate instruction fetch address registers to store program counters for multiple threads.

In at least one embodiment, processors 204 each include a first level (L1) cache (not separately shown in FIG. 2) that is coupled to a shared second level (L2) cache 206, which is in turn coupled to a shared third level (L3) cache 214. The L1, L2, and L3 caches may be combined instruction and data caches or correspond to separate instruction and data caches. In the illustrated embodiment, L2 cache 206 is further coupled to a fabric controller 208 that is coupled to a main memory controller (e.g., included in a Northbridge) 210, which supports a main memory subsystem 212 that, in various embodiments, includes an application appropriate amount of volatile and non-volatile memory. In alternative embodiments, fabric controller 208 may be omitted and, in this case, L2 cache 206 may be directly connected to main memory controller 210.

Fabric controller 208, when implemented, facilitates communication between different CMPs and between processors 204 and memory subsystem 212 and, in this manner, functions as an interface. As is further shown in FIG. 2, main memory controller 210 is also coupled to an I/O channel controller (e.g., included in a Southbridge) 216, which is coupled to a host channel adapter (HCA)/switch block 218. HCA/switch block 218 includes an HCA and one or more switches that may be utilized to couple CMP 202 to CMPs in other nodes (e.g., I/O subsystem nodes and processor nodes) of HPC cluster 100.

Figure 3:
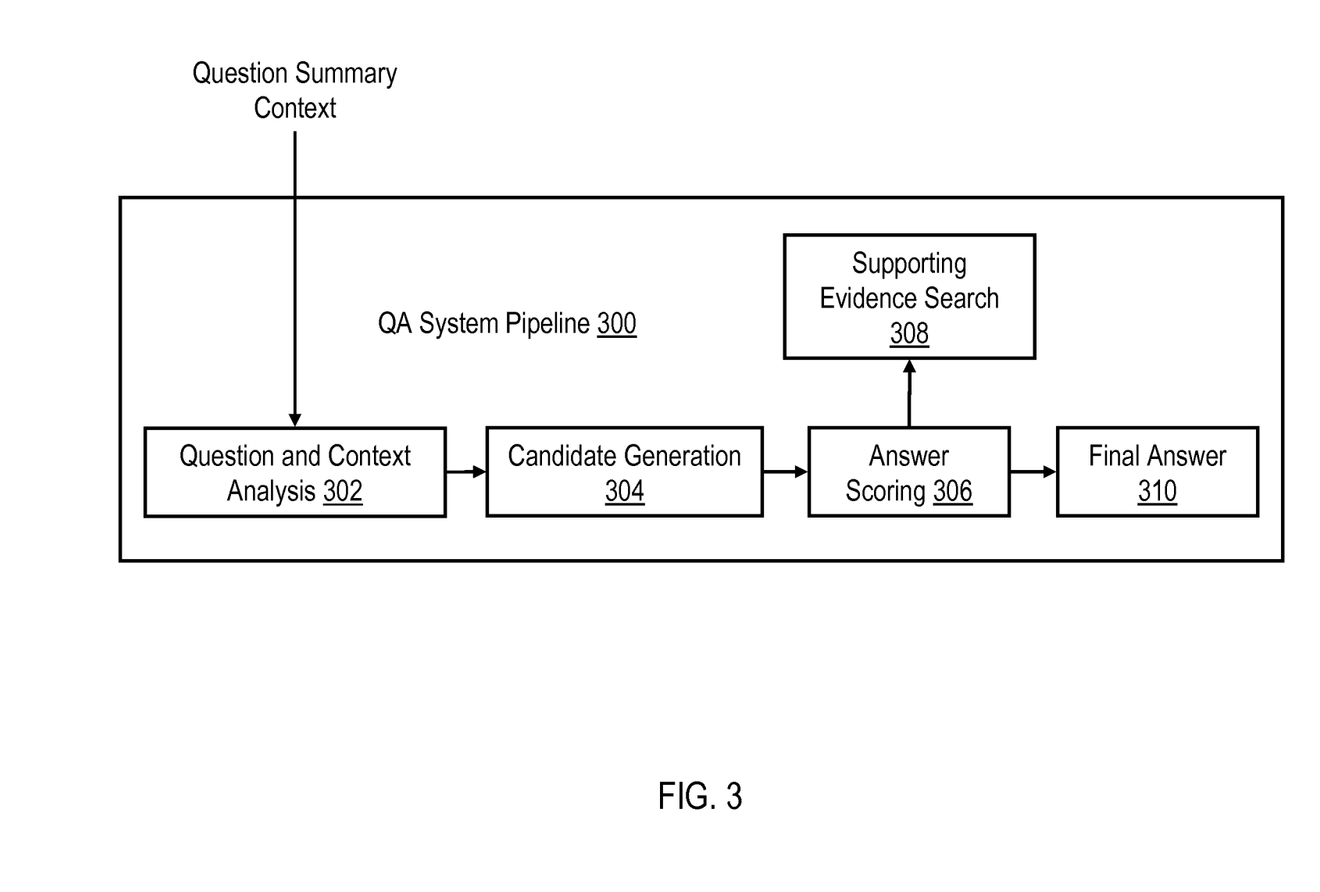
FIG. 3 depicts relevant components of an exemplary data processing system pipeline in the form of a question answering (QA) system pipeline.

FIG. 3 illustrates relevant components of a QA system pipeline for an exemplary QA system. As is illustrated in FIG. 3, a question and context analysis block 302 of QA system pipeline 300 receives a question (e.g., in the form of a question summary context) as an input and generates an output representing its analysis of the question and the context of the question. A candidate generation block 304 of QA system pipeline 300 receives the output from question and context analysis block 302 at an input and generates candidate answers for the question. The candidate answers are provided to an input of an answer scoring block 306, which is configured to initiate a supporting evidence search (by supporting evidence search block 308) in order to score the various generated answers. The results of the answer scoring are provided to a final answer block 310, which is configured to provide a final answer to the question based on the scoring of the candidate answers. It should be appreciated that blocks 302-310 may be implemented in program code executing on one or more processor cores or may be directly implemented in dedicated hardware (logic).

Figure 4:
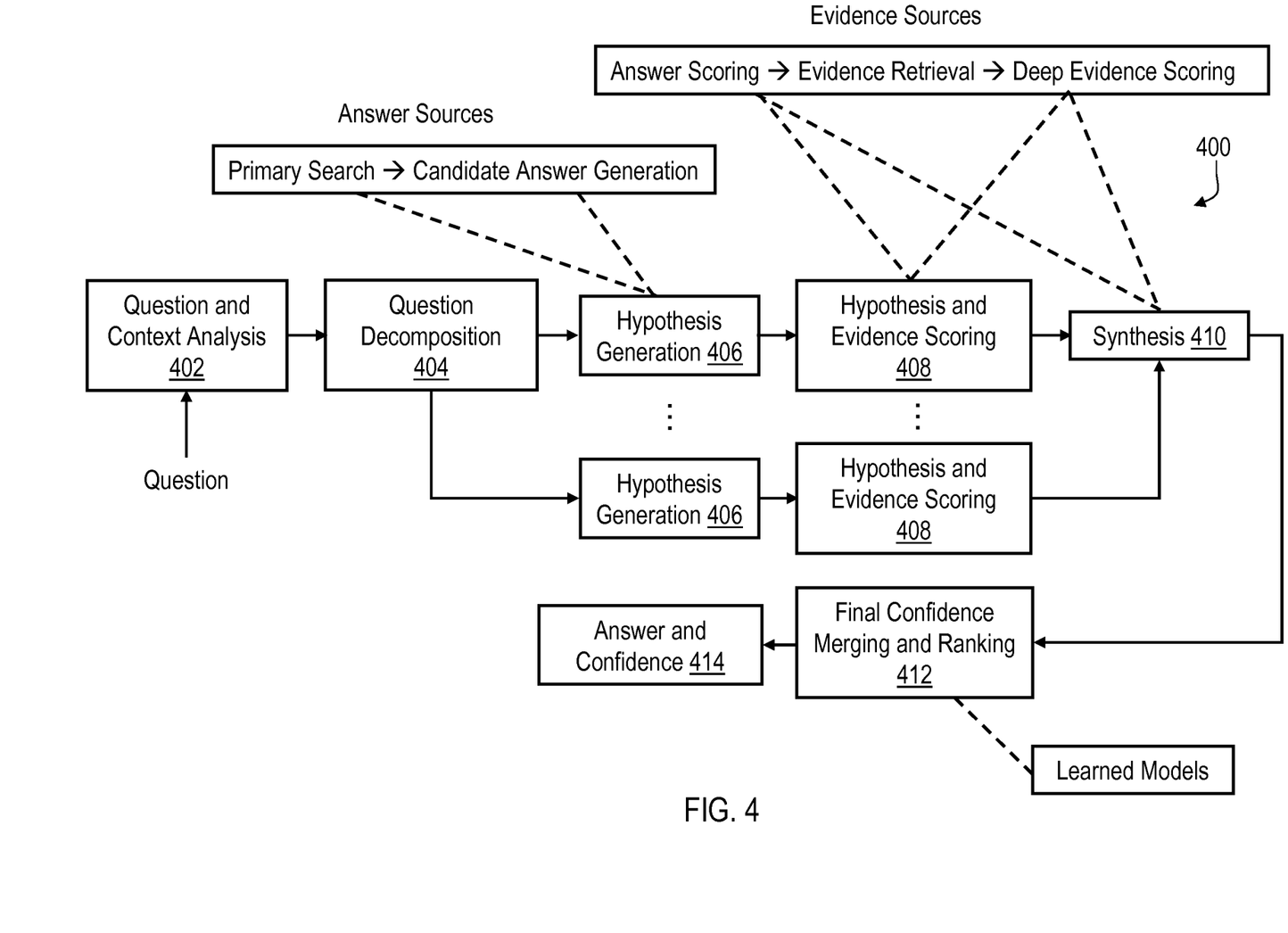
FIG. 4 depicts relevant components of the exemplary QA system pipeline of FIG. 3 in additional detail.

FIG. 4 illustrates relevant components of an exemplary QA system pipeline 400 in additional detail. As is illustrated, question and analysis context block 402 receives a question in a natural language. An output of block 402 is provided to a question decomposition block 404, which further analyzes the different textual, grammatical, linguistic, punctuation and/or other components of the question. Block 404 provides inputs to multiple hypothesis generation blocks 406, which perform parallel hypothesis generation. Hypothesis generation blocks 406 each perform a primary search, collect reference data from different structured and unstructured sources, and generate candidate answers. For example, data generated by hypothesis 'i' may be referenced as 'D_i', and data generated by hypothesis 'j' may be referenced as 'D_j'. The data 'D_i' and 'D_j' may be the same data, completely different data, or may include overlapping data.

As one example, a QA system may be configured, according to the present disclosure, to: receive a question; create 'N' hypotheses (1 . . . N) to find candidate answers (e.g., N=10); and load data for each hypothesis 'i' on which to operate into a shared cache. For example, assuming a shared cache across all hypotheses, 1/Nth of the shared cache may be loaded with data for each hypothesis to operate on. The QA system may be further configured to execute the 'N' hypotheses to return 'M' candidate answers (in this case, each hypothesis generates one or more candidate answers). For example, the notation 'ANS_i' may be employed to denote a set of candidate answers generated by hypothesis 'i'. In various embodiments, hypothesis and evidence scoring for each hypothesis is initiated in hypothesis and evidence scoring blocks 408. That is, the QA system is further configured to score all the candidate answers using hypothesis and evidence scoring techniques (e.g., providing 'M' scores for 'M' candidate answers). In synthesis block 410 the QA system evaluates the candidate answers with the highest scores and determines which hypotheses generated the highest scores.

Following block 410, the QA system initiates final confidence merging and ranking in block 412. Finally, in block 414, the QA system provides an answer (and may provide a confidence score) to the question. Assuming, for example, the candidate answers 'j', 'k', and 'l' have the highest scores, a determination may then be made as to which of the hypotheses generated the best candidate answers. As one example, assume that hypotheses 'c' and 'd' generated the best candidate answers 'j', 'k', and 'l'. The QA system may then upload additional data required by hypotheses 'c' and 'd' into the cache and unload data used by other hypotheses from the cache. According to the present disclosure, the priority of what data is uploaded is relative to candidate scores (as such, hypotheses producing lower scores have less associated data in cache). When a new question is received, the above-described process is repeated. If the hypotheses 'c' and 'd' again produce best candidate answers, the QA system loads more data that is relevant to the hypotheses 'c' and 'd' into the cache and unloads other data.

If, on the other hand, hypotheses 'h' and 'g' produce the best candidate answers to the new question, the QA system loads more data relevant to the hypotheses 'h' and 'g' into the cache and unloads other data. It should be appreciated that, at this point, hypotheses 'c' and 'd' probably still have more data in the cache than other hypotheses, as more relevant data was previously loaded into the cache for the hypotheses 'c' and 'd'. According to the present disclosure, the overall process repeats in the above-described manner by basically maintaining data in the cache that answer and evidence scoring indicates is most useful. The disclosed process may be unique to a QA system when a cache controller is coupled directly to an answer and evidence scoring mechanism of a QA system.

Figure 5:
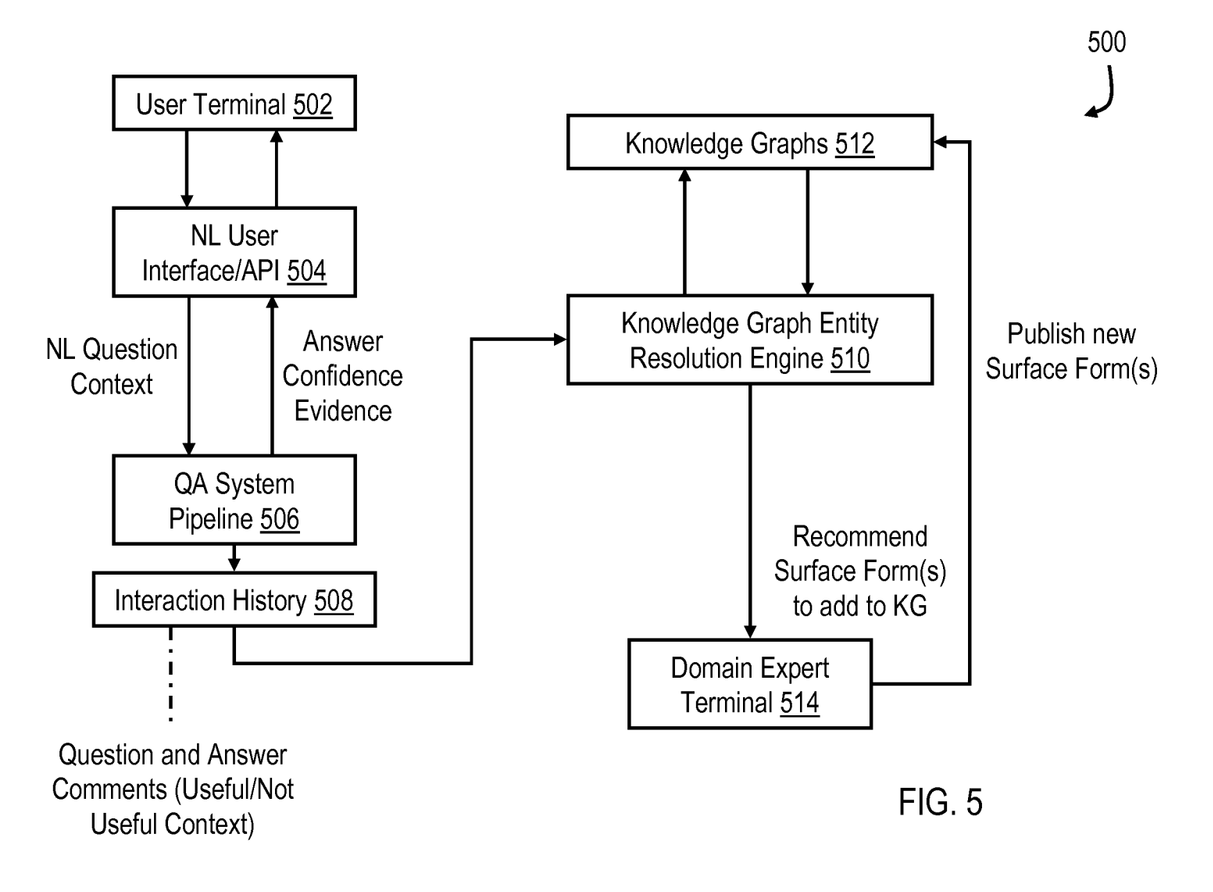
FIG. 5 is a diagram of a relevant portions of a QA system that implements a knowledge graph (KG) entity resolution engine configured according to one aspect of the present disclosure.

With reference to FIG. 5, a relevant portion of a QA system 500 is illustrated that is configured, according to the present disclosure, to resolve entities in received questions (i.e., to match identified entities in received questions with entities in an associated KG). A user terminal 502 may be employed by a user to input questions (via a natural language (NL) interface/application programming interface (API) 504) to a QA system pipeline 506 and to provide feedback to QA system pipeline 506 in response to a request for feedback during entity resolution. For example, user terminal 502 may be implemented in a data processing system, a smart phone, gaming console, or an automobile. NL interface/API 504 provides, for example, an NL question context to QA system pipeline 506 and receives, for example, answer confidence evidence from QA system pipeline 506, which may take the form of a QA system pipeline as depicted in FIGS. 3 and/or 4. QA system pipeline 506 stores information (e.g., questions, answers, and question and answer comments provided by users in a useful/not useful context) in an interaction history 508 (e.g., a database).

In various embodiments, knowledge graph entity resolution engine 510 accesses (e.g., periodically or on-demand) the stored information in interaction history 508. Engine 510 utilizes the information stored in interaction history 508 and information in a domain appropriate KG of knowledge graphs (KGs) 512 to resolve entities in a received question. KGs 512 may, for example, be stored in databases that are accessed via the Cloud. Based on its analysis, engine 510 recommends (to domain expert terminal 514) the addition of one or more surface forms for an entity, if appropriate, for addition to a domain appropriate KG in KGs 512. Based on its analysis, a domain expert may also publish (utilizing domain expert terminal 514) one or more new surface forms for an entity to a domain appropriate KG in KGs 512.

Figure 6:
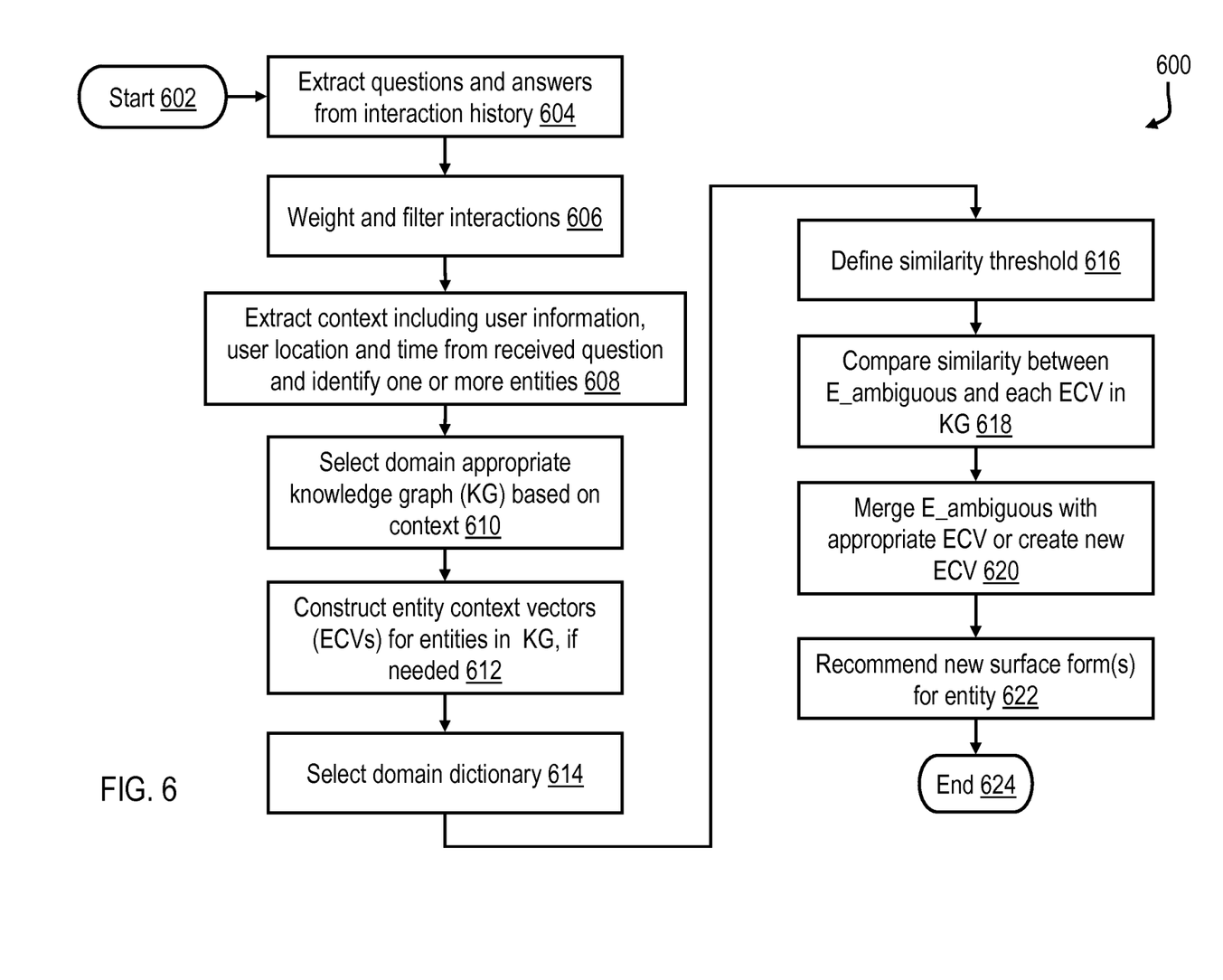
FIG. 6 is a flowchart of an exemplary process for resolving entities present in received questions that is implemented by a KG entity resolution engine configured according to an embodiment of the present disclosure.

With reference to FIG. 6, a process 600 for resolving entities in received questions is illustrated. Process 600 may be, for example, executed by one or more data processing systems 200 that implement knowledge graph entity resolution engine 510 of QA system 500. In block 602 process 600 is initiated by data processing system 200 (executing engine 510), e.g., in response to a user initiating a QA session by inputting a question. In various embodiments, questions are received in a natural language. Next, in block 604, data processing system 200 (executing engine 510) extracts questions and answers from interaction history 508. Then, in block 606, data processing system 200 (executing engine 510) weights and filters the interactions (i.e., the question and answer extracted from interaction history 508). Next, in block 608, data processing system 200 (executing engine 510) extracts a context from the received question and identifies one or more entities in the received question. For example, the context may include user information (e.g., gender and age), a user location, and a time the received question was input into QA system 500.

Then, in block 610, data processing system 200 (executing engine 510) selects a domain appropriate knowledge graph (KG) based on the context from the received question. Next, in block 612, data processing system 200 (executing engine 510) constructs entity context vectors (ECVs) for all entities in the domain appropriate KG, assuming the ECVs do not already exist. Then, in block 614, data processing system 200 (executing engine 510) selects a domain dictionary for the entities identified in the received question. As previously mentioned, the domain dictionary provides a pre-computed set of weights for various surface forms in the domain appropriate KG.

Next, in block 616, data processing system 200 (executing engine 510) defines a similarity threshold. Then, in block 618, data processing system 200 (executing engine 510) compares the similarity between E_ambiguous and each ECV in the KG. Next, in block 620, data processing system 200 (executing engine 510) merges E_ambiguous with an appropriate ECV or creates a new ECV assuming an appropriate ECV is not located. Then, in block 622, data processing system 200 (executing engine 510) recommends one or more new surface forms for addition to the KG. The recommendation may be reviewed by a subject matter expert for a determination of whether to add the new surface form(s) to an existing ECV, create a new ECV with the surface form, or to ignore the recommendation. From block 622 control passes to block 624, where process 600 terminates until a user inputs a new question to QA system 500.

Accordingly, techniques have been disclosed herein that advantageously resolve entities in received questions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of resolving entities included in a question, said method comprising:
creating, using a data processing system, a respective one of a plurality of entity context vectors (ECVs) for each of a plurality of entities in an applicable knowledge graph (KG), wherein the creating includes the data processing system accessing the KG in a database via a cloud network, wherein each ECV in at least a subset of the plurality of ECVs defines domain-dependent rankings of multiple surface forms of the respective entity for each of multiple domains;
receiving, using the data processing system, a question in a natural language from a user;
determining, using the data processing system, a domain associated with the user based on multi-factorial context attributes about the user that posed the question;
identifying, using the data processing system, a first entity in the question, wherein the identifying includes accessing the KG in the database via the cloud network;
determining, by the data processing system, a plurality of similarity metrics, each expressing a degree of similarity between the first entity in the question and a respective one of the plurality of ECVs;
based on at least one of the similarity metrics satisfying a similarity threshold, associating, using the data processing system, the first entity with a matching entity among the plurality of entities in the KG that has a greatest similarity with the first entity;
modifying, using the data processing system, an ECV for the matching entity, wherein the modifying includes updating, in the ECV, the domain-dependent ranking of the matching entity to rank a first surface form of the first entity identified in the question higher with respect to one or more other surface forms in the domain associated with the user; and
generating, using the data processing system, an answer in the natural language to the question based on the modified ECV.

2. The method of claim 1, wherein the modifying an ECV for the matching entity in the KG includes:
adding a new surface form of the first entity to the ECV.

3. The method of claim 2, further comprising:
publishing the new surface form of the first entity to the KG in the database via the cloud network.

4. The method of claim 2, wherein the new surface form is generated due to a change in at least one of a set consisting of a title of the first entity, a status of the first entity, and an association of the first entity.

5. The method of claim 1, wherein each of the plurality of ECVs includes dependency parses for entities included in the ECVs.

6. The method of claim 5, wherein each of the plurality of ECVs further includes bags of words, entity type, and known surface forms for entities included in the ECVs.

7. A computer program product configured to transform questions for a question answering (QA) system, the computer program product comprising:
a computer-readable storage device; and
computer-readable program code embodied on the computer-readable storage device, wherein the computer-readable program code, when executed by a data processing system, causes the data processing system to perform:
creating a respective one of a plurality of entity context vectors (ECVs) for each of a plurality of entities in an applicable knowledge graph (KG), wherein the creating includes the data processing system accessing the KG in a database via a cloud network, wherein each ECV in at least a subset of the plurality of ECVs defines domain-dependent rankings of multiple surface forms of the respective entity for each of multiple domains;
receiving a question in a natural language from a user;
determining a domain associated with the user based on multi-factorial context attributes about the user that posed the question;
identifying a first entity in the question, wherein the identifying includes accessing the KG in the database via the cloud network;
determining a plurality of similarity metrics, each expressing a degree of similarity between the first entity in the question and a respective one of the plurality of ECVs;
based on at least one of the similarity metrics satisfying a similarity threshold, associating the first entity with a matching entity among the plurality of entities in the KG that has a greatest similarity with the first entity;
modifying an ECV for the matching entity, wherein the modifying includes updating, in the ECV, the domain-dependent ranking of the matching entity to rank a first surface form of the first entity identified in the question higher with respect to one or more other surface forms in the domain associated with the user; and
generating an answer in the natural language to the question based on the modified ECV.

8. The computer program product of claim 7, wherein the computer-readable program code, when executed by the data processing system, further configures the data processing system to perform:
adding a new surface form of the first entity to the ECV.

9. The computer program product of claim 8, wherein the computer-readable program code, when executed by the data processing system, further configures the data processing system to perform:
adding the new surface form of the first entity to the KG in the database via the cloud network.

10. The computer program product of claim 8, wherein the new surface form is generated due to a change in at least one of a set consisting of a title of the first entity, a status of the first entity, and an association of the first entity.

11. The computer program product of claim 7, wherein each of the plurality of ECVs includes dependency parses for entities included in the ECVs.

12. The computer program product of claim 11, wherein each of the plurality of ECVs further includes bags of words, entity type, and known surface forms for entities included in the ECVs.

13. A data processing system, comprising:
a cache memory; and
a processor coupled to the cache memory, wherein the processor is configured to perform:
creating a respective one of a plurality of entity context vectors (ECVs) for each of a plurality of entities in an applicable knowledge graph (KG), wherein the creating includes the data processing system accessing the KG in a database via a cloud network, wherein each ECV in at least a subset of the plurality of ECVs defines domain-dependent rankings of multiple surface forms of the respective entity for each of multiple domains;
receiving a question in a natural language from a user;

determining a domain associated with the user based on multi-factorial context attributes about the user that posed the question;

identifying a first entity in the question, wherein the identifying includes accessing the KG in the database via the cloud network;

determining a plurality of similarity metrics, each expressing a degree of similarity between the first entity in the question and a respective one of the plurality of ECVs;

based on at least one of the similarity metrics satisfying a similarity threshold, associating the first entity with a matching entity among the plurality of entities in the KG that has a greatest similarity with the first entity;

modifying an ECV for the matching entity, wherein the modifying includes updating, in the ECV, the domain-dependent ranking of the matching entity to rank a first surface form of the first entity identified in the question higher with respect to one or more other surface forms in the domain associated with the user; and generating an answer in the natural language to the question based on the modified ECV.

14. The data processing system of claim 13, wherein the processor is further configured to perform:

adding a new surface form of the first entity to the ECV.

15. The data processing system of claim 14, wherein the processor is further configured to perform:

adding the new surface form of the first entity to the KG in the database via the cloud network.

16. The data processing system of claim 14, wherein the new surface form is generated due to a change in at least one of a set consisting of a title of the first entity, a status of the first entity, and an association of the first entity.

17. The data processing system of claim 13, wherein each of the plurality of ECVs includes dependency parses, bags of words, entity type, and known surface forms for entities included in the ECVs.

* * * * *